(12) United States Patent
Worthington et al.

(10) Patent No.: US 7,788,435 B2
(45) Date of Patent: Aug. 31, 2010

(54) INTERRUPT REDIRECTION WITH COALESCING

(75) Inventors: Bruce L. Worthington, Redmond, WA (US); Goran Marinkovic, Kirkland, WA (US); Brian Railing, Redmond, WA (US); Qi Zhang, Redmond, WA (US); Swaroop V. Kavalanekar, Issaquah, WA (US)

(73) Assignee: Microsoft Corporation, Redmond, WA (US)

( * ) Notice: Subject to any disclaimer, the term of this patent is extended or adjusted under 35 U.S.C. 154(b) by 267 days.

(21) Appl. No.: 11/971,775

(22) Filed: Jan. 9, 2008

(65) Prior Publication Data

US 2009/0177829 A1  Jul. 9, 2009

(51) Int. Cl.
*G06F 13/24* (2006.01)
(52) U.S. Cl. .................. 710/263; 719/318
(58) Field of Classification Search ............ 710/260, 710/263, 267–268, 48; 709/223; 719/314, 719/318
See application file for complete search history.

(56) References Cited

U.S. PATENT DOCUMENTS

| | | | |
|---|---|---|---|
| 5,428,799 A | 6/1995 | Woods et al. | |
| 6,711,643 B2 | 3/2004 | Park et al. | |
| 6,976,099 B2 | 12/2005 | George et al. | |
| 7,013,358 B2 | 3/2006 | Lueck et al. | |
| 7,103,693 B2 * | 9/2006 | Anand et al. | 710/260 |
| 7,197,588 B2 | 3/2007 | Tsao et al. | |
| 7,222,203 B2 | 5/2007 | Madukkarumukumana et al. | |
| 2005/0066333 A1 | 3/2005 | Krause et al. | |
| 2006/0095624 A1 | 5/2006 | Raj et al. | |
| 2006/0294277 A1 | 12/2006 | Tetrick | |
| 2007/0005742 A1 * | 1/2007 | Eldar et al. | 709/223 |
| 2007/0067534 A1 | 3/2007 | Butler et al. | |
| 2007/0079039 A1 | 4/2007 | Raj | |

OTHER PUBLICATIONS

*Interrupt Coalescing*, http://publib.boulder.ibm.com/infocenter/systems/index.jsp?topic=/com.ibm.aix.prftungd/doc/prftungd/interrupt_coal.htm.
*Interrupt Architecture Enhancements in Microsoft Windows Vista*, download.microsoft.com/download/5/7/7/577a5684-8a83-43ae-9272-ff260a9c20e2/MSI.doc.

* cited by examiner

*Primary Examiner*—Clifford H Knoll
(74) *Attorney, Agent, or Firm*—Wolf, Greenfield & Sacks, P.C.

(57) ABSTRACT

An interrupt redirection and coalescing system for a multi-processor computer. Devices interrupt a processor or group of processors using pre-defined message address and data payloads communicated with a memory write transaction over a PCI, PCI-X, or PCI Express bus. The efficiency of processing may be improved by combining multiple interrupt notifications into a single interrupt message to a processor. For some interrupts on a multi-processor computer, such as those signaling completion of an input/output (I/O) operation assigned to a device, the efficiency of processing the interrupt may vary from processor to processor. Processing efficiency and overall computer system operation may be improved by appropriately coalescing interrupt messages within and/or across a plurality of queues, where interrupts are queued on the basis of which processor they target.

20 Claims, 6 Drawing Sheets

INTERRUPT REDIRECTION WITH COALESCING

BACKGROUND

Computer systems consist of one or more processors, each of which executes a collection of machine instructions. The processors may be physical components implemented in semiconductor chips or may be virtual, implemented by operations on one or more physical processors.

Some of the instructions executed by a processor may be performed entirely within the processor. Though, other instructions may entail interaction between the processor and other components of the computer system. Frequently, computer systems will contain separate devices with which the processors will interact as the computer operates. For example, memory operations may entail interactions with a hard disk and network communication operations may entail interaction with a network interface card.

To facilitate these interactions, a computer system may have a bus that supports communication between a processor and other devices. One common type of bus is known as the PCI (Peripheral Component Interconnect) bus. In addition to allowing data to be exchanged, some buses support messages that can signal an interrupt. A device may use such a message to signal to a processor that it has completed an operation requested by the processor or that it has otherwise performed some action or detected a condition that requires service from a processor. In this way, a processor can assign an operation to a device and perform other functions while the device is performing the operation.

Once the device finishes the operation, a processor is notified by the interrupt and may perform completion processing on the operation. The nature of completion processing may vary based on the device or operation performed. Examples of completion processing include reading data from the device or delivering retrieved data to an application that requested the data.

Buses implemented according to the PCI, PCI-X, or PCI Express standard support the message signaled interrupt (MSI) and the message signaled interrupt extended (MSI-X) protocols. Devices that use these protocols may request service by writing a system specified data value to the system specified address using a PCI memory write transaction. System software initializes the message address and message data during device configuration. The message address encodes information on the target processors and delivery mode. The device performs a memory write for a pre-configured MSI message to interrupt the processor.

As is known by those skilled in the art, significant processor overhead is required in processing each interrupt. Accordingly, various interrupt coalescing techniques have been developed in order to reduce the total overhead in performing completion processing, or other interrupt-related processing, on multiple operations. These interrupt coalescing techniques involve sending an interrupt message notifying a processor that multiple operations have been performed and are ready for completion processing. The message event, which could be completion, could be sent in response to a predetermined number of operations, in combination with expiration of a predetermined time period.

SUMMARY OF INVENTION

In a multi-processor computer system, overall efficiency of interrupt servicing may be impacted by factors other than the number of notifications coalesced in a message. Factors may include the type of processing required and the processor that performs the processing. Interrupt servicing and overall computer system operation may be improved by appropriately coalescing notifications that operations have been completed by a device, based on which processor the notifications target. As each notification is generated, an efficient processor may be selected as a target for that notification. If notifications targeting one or more processors are not generated at a sufficient rate to allow a message consolidating a sufficient number of notifications targeting a single processor to be formed, notifications targeting different processors may be combined in a composite message.

One or more factors may be used to determine when notifications initially targeting different processors are combined into a consolidated message and which messages are consolidated. In some embodiments, those factors may include time since notifications were generated, the numbers of notifications targeting the processors, and the proximity of processors to which notifications are targeted. Processors may be deemed to be in close proximity if they are either in close physical proximity or if they have a proximity that facilitates efficient communication between one another.

A device operating according to some embodiments of the invention may contain circuitry to perform coalescing in response to factors that may be programmed. The circuitry may include the capability to store messages that target a group of processors, queues that separately hold notifications targeting different processors in the group, and control circuitry that monitors factors such as the numbers of messages in each queue and the length of time that a notification has been in each queue. In some embodiments, the control circuitry may be programmed to combine notifications in the queues based on the processors targeted, the monitored factors, and/or other criteria.

Appropriate definition of the stored messages may also improve overall efficiency of computer system operation. Processing efficiency may be increased by selecting a group of processors that can be targeted for completion processing or other interrupt-related processing in a way that increases the likelihood that a processor that can efficiently perform the processing for any notification will be in the group. By defining messages such that the processors they target are distributed across groups of processors, with each group representing processors in close proximity, there is an increased likelihood that the processing load is more efficiently distributed.

Accordingly, in one aspect, the invention relates to a method of operating a device coupled to a multi-processor computer system to queue processor notifications indicating that an operation has been performed and further action is needed. If the number of queued notifications targeting a first processor exceeds a predetermined threshold before a trigger event occurs, then a first consolidated message comprising the queued notifications is sent to the first processor. If the threshold number of queued notifications targeting the first processor is not exceeded before the trigger event occurs, then a second consolidated message is sent to the first processor which includes the notifications targeted to it as well as notifications that were targeted to at least one second processor.

In another aspect, the invention relates to a method of operating a device coupled to a multi-processor computer system to separately queue processor notifications that target each of a set of the available processors and to monitor to detect an event comprising a number of queued notifications targeting a processor or the passage of time. If such an event is detected, a message is sent to a selected processor of the set. That message contains notifications selected from the separately queued notifications based on the number of queued notifications that target each of at least a portion of the processors of the set.

In a further aspect, the invention relates to a device coupled to a multi-processor computer over a bus. The device has circuitry to perform one or more operations and to generate notifications to a processor indicating that an operation has been performed and further action is needed. The device may be programmed to detect whether a threshold number of queued notifications targeting a first processor is exceeded during an interval, in which case a first consolidated message comprising the queued notifications is sent to the first processor. If the threshold number of queued notifications targeting the first processor is not exceeded during the interval, then a second consolidated message is sent to the first processor which includes the notifications targeted to it as well as notifications that were targeted to at least one second processor.

The foregoing is a non-limiting summary of the invention, which is defined by the attached claims.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

Figure 1:
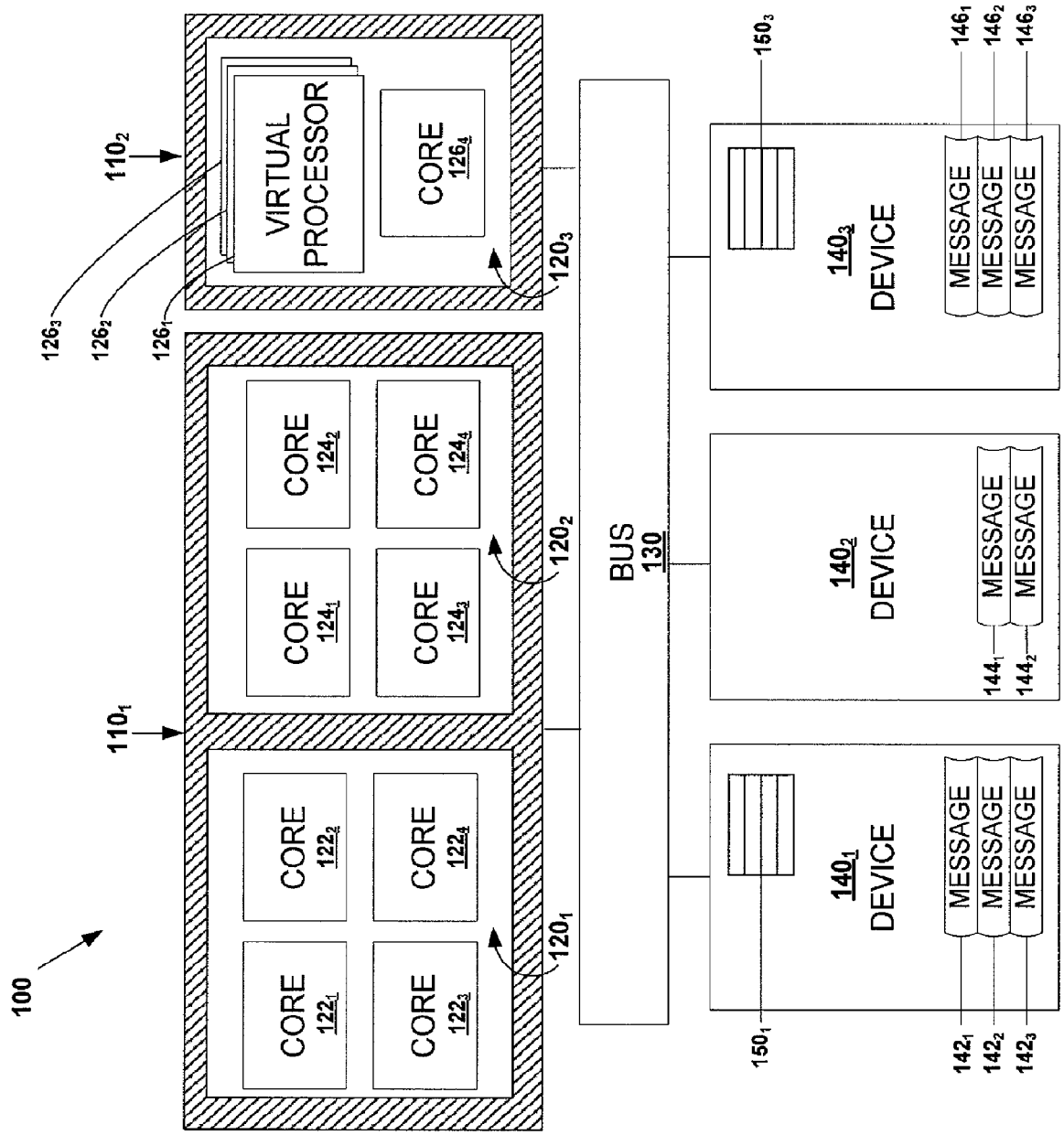
FIG. 1 is a sketch illustrating a high-level overview of a prior-art multi-processor computer system.

For multiple interrupt notifications targeting a particular processor on a multi-processor computer, the efficiency of processing them may be improved by combining them into a single interrupt message to the processor. When a processor is interrupted, some portion of its current state, including the state of all the threads that it is executing, may need to be stored into memory. The processor must then perform whatever actions are required of it based on the nature of the interrupt and the device interrupting it. After finishing these operations, the processor must retrieve any previous stored state from memory in order to resume its actions prior to being interrupted. This overhead associated with an interrupt is magnified if a processor must repeatedly address interrupts individually over a short period of time. A performance improvement may be achieved by batching or coalescing interrupts in an effort to amortize this type of overhead.

The inventors have appreciated that for some interrupts on a multi-processor computer, such as those signaling completion of an input/output (I/O) operation assigned to a device, the efficiency of processing the interrupt may vary from processor to processor. Further, the efficiency with which each processor performs an operation may be proximity-based. Consequently, while coalescing may improve efficiency in some respects, it may decrease efficiency in other respects by causing completion processing of some operations to be performed by inefficient processors.

For example, in completion processing performed following an I/O operation, a processor that initiated the I/O operation may be able to more efficiently access information or instructions necessary to complete the processing. Such a situation can arise because the processor initiating an operation may have information or instructions used in completing the I/O operation stored in a local cache or other memory locations to which that processor has preferential access. As a result, that processor may be capable of more efficiently performing processing that completes the operation than other processors. For another processor to perform the same operation, there may be a loss of efficiency associated with processor-to-processor communication as the processor that initiated the I/O operation supplies information to the processor performing the completion processing. This loss of efficiency may be reduced if the alternate processor chosen is in close proximity to the initiating processor. A processor may be deemed to be in close proximity to another processor if they are either in close physical proximity or if they have a proximity that facilitates efficient communication between one another. However, interrupt coalescing may result in completion processing being performed by inefficient processors.

The inventors have appreciated that performing interrupt coalescing in a way that preserves an efficient choice of target processor may result in improved performance. Accordingly, in embodiments of the inventions, interrupt notifications are grouped in queues based on the processor targeted by each notification. Notifications that have accumulated in such queues may be consolidated into a single interrupt message on the basis of various trigger events having occurred and/or whether the queued notifications target close proximity processors.

FIG. 1 depicts a computer system 100 in which embodiments of the invention may be used. System 100 consists of multiple processors, both physical and virtual. In the example of FIG. 1, processors $122_1, \ldots, 122_4, 124_1, \ldots, 124_4$, and $126_1, \ldots, 126_4$ are shown. Each of the processors may be implemented on one or more semiconductor chips, with each semiconductor chip supporting one or more processors. System 100 is shown with semiconductor chips, $120_1, 120_2$, and $120_3$. Twelve processors and three semiconductor chips are shown for simplicity, but the number of processors and semiconductor chips is not a limitation on the invention and any suitable number may be used.

Each of the semiconductor chips may be implemented as is known in the art. In the example of FIG. 1, semiconductor chips $120_1$ and $120_2$ are quad-core semiconductor chips, with each core being usable as a processor. Semiconductor chip $120_3$ is a single core chip. Such semiconductor chips are commercially available from sources such as Intel Corporation.

FIG. 1 illustrates that each processor does not need to correspond to separate physical circuitry. One or more of the processors may be virtual processors. In the example of FIG. 1, processors $126_1 \ldots 126_3$ are implemented as virtual processors. Virtual processors $126_1 \ldots 126_3$ may be implemented using known virtualization software executing within an operating system of computer 100. However, in embodiments of the invention, semiconductor chips and either physical or virtual processors may be implemented in any suitable way or may be obtained from any suitable source.

Chips $120_1$ and $120_2$ are mounted on printed circuit board (PCB) $110_1$, and chip $120_3$ is mounted on PCB $110_2$. Though two PCBs are shown, the number of PCBs is not a limitation of the invention and any suitable number may be used.

Components on different PCBs or on different parts of the computer system 100 may communicate over one or more buses. Processors may communicate over one bus, while I/O devices may communicate over another. In the example of FIG. 1, only a single bus is illustrated for simplicity. In such an embodiment, the processors on chip $120_1$ may communicate with the processors on chip $120_3$ using bus 130. Bus 130 may be a standardized bus as is known in the art. For example, bus 130 may be a PCI bus. However, the construction and protocol of bus 130 are not critical to the invention and any suitable bus or buses may be used in embodiments of the invention.

In operation, the processors may execute software such as application software or operating system software that performs functions based on the desired functionality of computer 100. Some functions may involve operations performed solely within the processors. Other functions may involve operations assigned to devices $140_1 \ldots 140_3$. Processors in FIG. 1 may communicate with devices $140_1, 140_2, 140_3$ over bus 130, including assigning operations to the devices $140_1 \ldots 140_3$.

Each device may process an operation assigned to it as a result of communication with one or more of the processors. In embodiments of the invention, the devices may perform I/O operations or any other suitable type of operation. Such devices may include hard disks, sound and video capture cards, network cards, or any other suitable device. Three devices are shown in system 100 for simplicity, but the number of devices is not a limitation on the invention and any suitable number may be used.

From time to time, a device may issue an interrupt to be serviced by a processor. Such interrupts may include a request for a processor to perform completion processing. In the embodiment illustrated, the devices use bus messages to signal interrupts to processors. Each device has a fixed number of messages available with which to transmit an interrupt to a targeted processor. For example, device $140_1$ has three messages $142_1, 142_2, 142_3$, which may target any three processors in the computer system 100.

In embodiments of the invention, it may be desirable to choose the target processor associated with each message such that messages are distributed across groups of processors that are in close proximity to one another. In this way, the likelihood is increased that a device will have available a message that can target an efficient processor. Also, there is an increased likelihood that the processor load is balanced. In embodiments of the invention, such messages may be formatted according to a suitable protocol for the bus over which they are transmitted. For example, PCI devices may utilize messages which operate according to the MSI-X protocol. Although FIG. 1 limits devices $140_1, 140_2$, and $140_3$ to three, two, and three messages respectively, the number of messages available to a device is not a limitation of the invention and any appropriate number may be used.

In operation, each of the messages, $142_1 \ldots 142_3, 144_1, 144_2, 146_1 \ldots 146_3$, may be defined by operating system software executing on one or more of the processors. However, in accordance with embodiments of the invention, the messages may be defined in any suitable way. In the example illustrated, each of the messages is addressed to target an interrupt handler in a physical or virtual processor within computer system 100. The message is also formatted to indicate to that interrupt handler that an interrupt represented by the message signals that a specific device has completed an assigned operation.

A device may incorporate interrupt coalescing techniques for interrupts resulting from various operations. In the prior-art example of FIG. 1, devices $140_1$ and $140_3$ allow known interrupt coalescing techniques, as indicated by queues $150_1$ and $150_3$ within each respective device. Such techniques include the generation of notifications by a device. For example, a notification may be information that indicates an operation has been completed and provides information for a processor to use in performing completion processing. The device continues generating and queuing notifications until a trigger event occurs, such as receipt of a threshold number of notifications, or expiration of a predetermined time period, or the receipt of a threshold number of notifications in combination with the expiration of a predetermined time period. The occurrence of a trigger event may result in the releasing or "flushing out" of the queue comprising the combining of all the queued notifications into one interrupt message.

Figure 2:
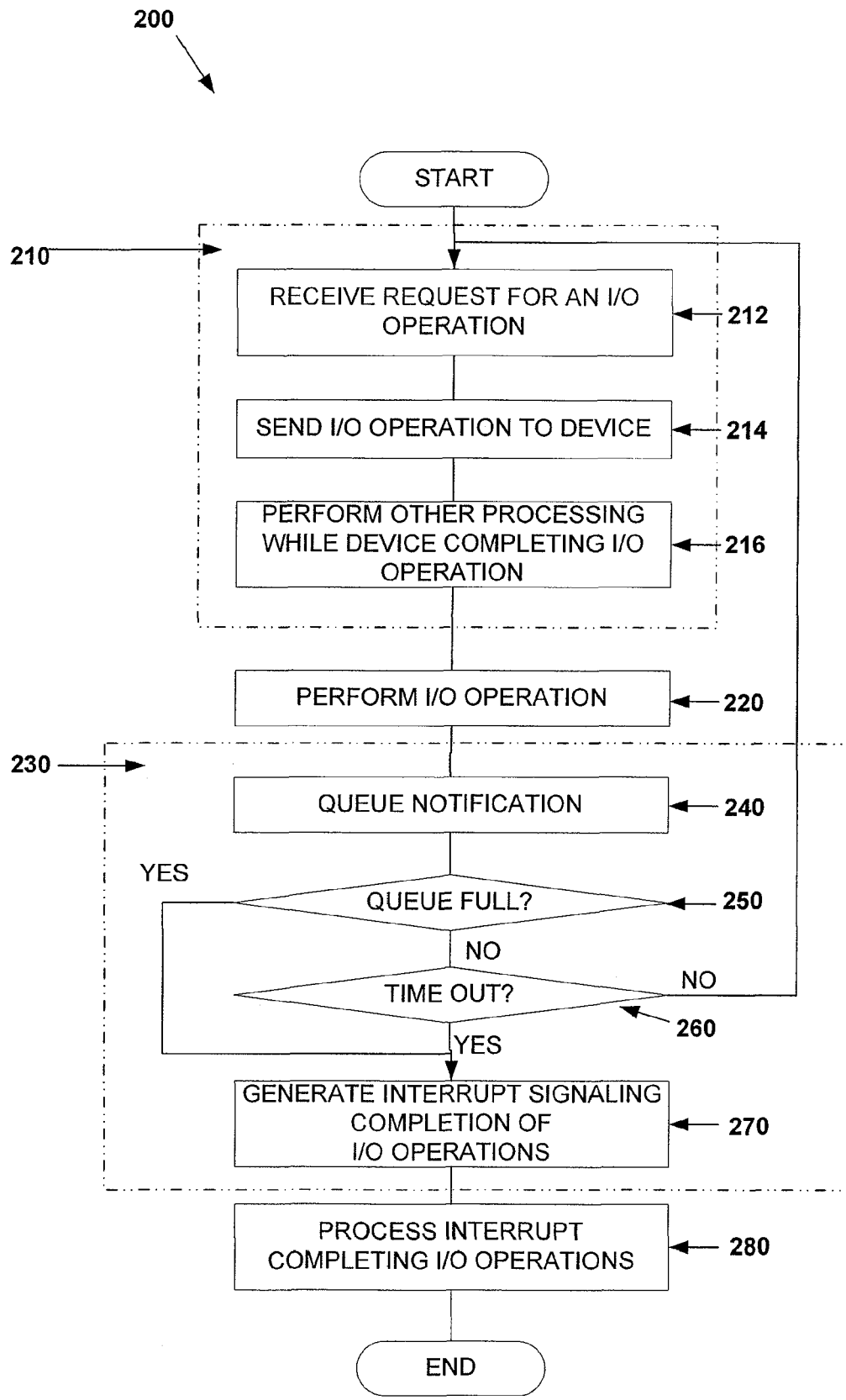
FIG. 2 is a block diagram showing the processing of an input/output (I/O) operation in a prior art interrupt coalescing enabled device coupled to a multi-processor computer system.

Interrupt coalescing may be used as part of a process of operating a computer system 100 that includes assigning operations to devices $140_1 \ldots 140_3$. For example, FIG. 2 is a block diagram showing the processing of an input/output (I/O) operation in a prior-art interrupt coalescing enabled device coupled to a multi-processor computer system. This I/O operation process 200 consists of subprocess 210, which comprises initial actions taken by a processor. Namely, in block 212, a processor receives a request for an I/O operation from an application program or other software being executed. Finally, at block 216, the initiating processor returns to performing other tasks.

Meanwhile, at block 220, the device performs the I/O operation assigned to it. Subprocess 230 denotes a prior-art implementation of interrupt coalescing. Namely, in block 240, the device generates a notification indicating that the I/O operation has been performed and further action is needed.

In decision blocks 250 and 260, the device checks to see if any trigger events have occurred. Namely, in block 250, the queue length is checked to see if a threshold number of notifications has been exceeded. In block 260, a check is done to determine if a threshold time period has expired, i.e., to check if the queue has "timed out." If neither of the threshold values has been exceeded, then the process begins again at block 212 and continues in the same fashion until one of these trigger events has occurred. Upon the occurrence of a trigger event, the device generates a single interrupt message informing a processor that a number of I/O operations have completed. The specific trigger condition or set of trigger conditions is not a limitation on the invention.

In other embodiments, blocks 210, 220, and 230 may be independent of one another and may loop within themselves. That is, I/O operation requests may constantly be coming in to one or more processors and being issued to one or more devices, while completions are constantly occurring and generating interrupts.

In any case, the receiving processor then processes the interrupt at block 280, thereby completing the I/O operations. Such completion processing may be as known in the art.

However, in embodiments of the invention, any suitable completion processing or other interrupt-related processing may be performed.

The inventors have appreciated that the efficiency of assigning an operation to a device may be improved by proper definition of messages used to signal completion of an assigned operation. Some processors may more efficiently service some interrupts than other processors, and by defining messages to increase the likelihood that an efficient processor is a target of a predefined message, overall efficiency may be improved. In embodiments of the invention it may be desirable to choose the target processor associated with each message such that messages are distributed across groups of processors, with each group representing processors in close proximity. In this way, the likelihood is increased that a device will have available a message that can target an efficient processor. Also, there is an increased likelihood that the overall processor load is balanced.

The inventors have further appreciated that efficiency improvements can also be made by coalescing interrupts by grouping notifications based on processors that can efficiently perform completion processing in response to the notifications. In some embodiments of the invention, notifications may be queued on a device in one of multiple queues, with each queue being associated with one or more processors. As a specific example, the processors associated with each queue may be selected to create proximity-based queues. Namely, a proximity-based queue is one where the processors being targeted by the notifications within it are in close proximity to one another. A processor may be deemed to be in close proximity to another processor if the processors are either in close physical proximity or if they have a proximity that facilitates efficient communication between one another. In this way, assigning a notification to a queue assigns a target processor.

Figure 3:
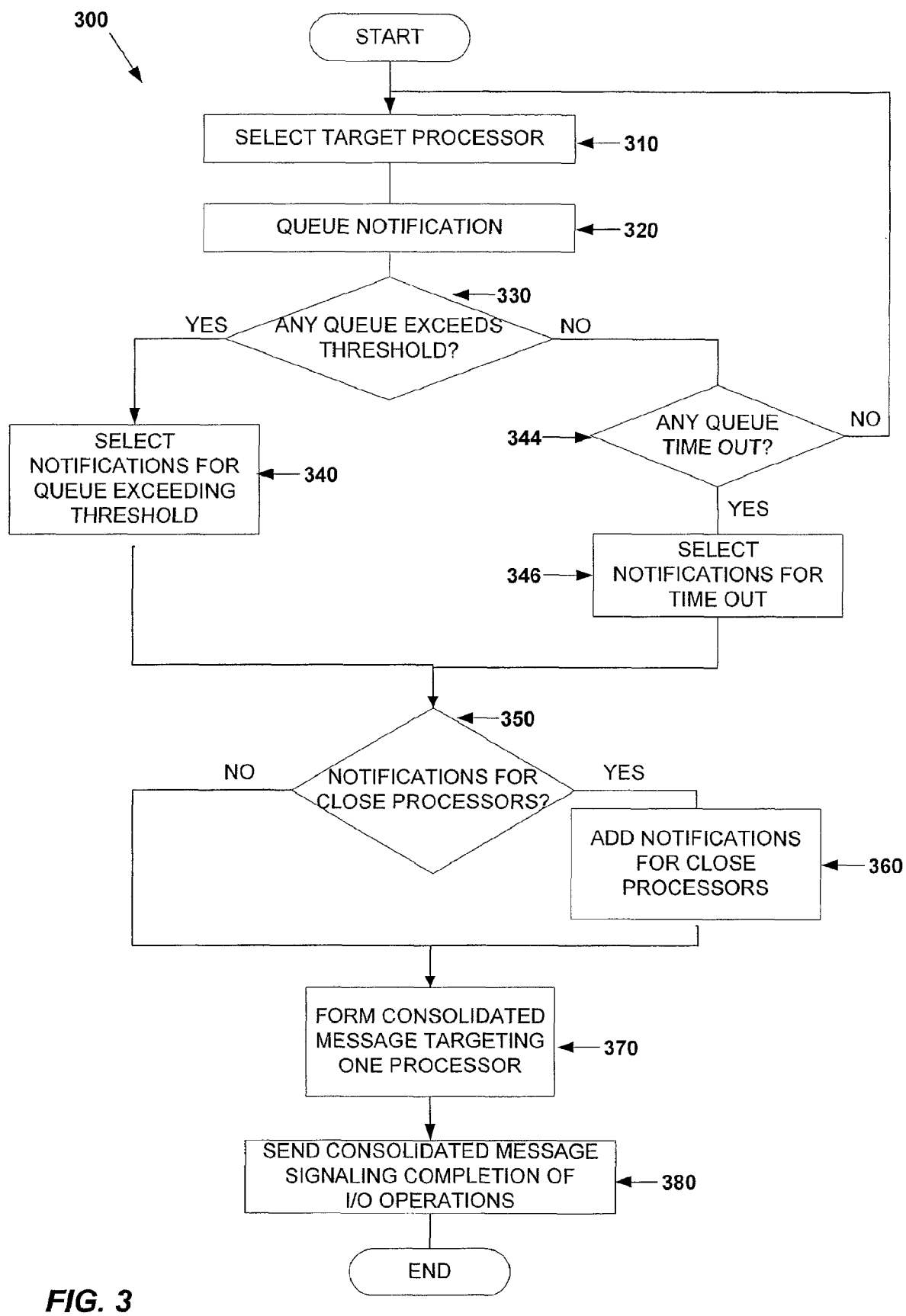
FIG. 3 is a flowchart of a process in which interrupt notifications are queued at the device and combined into a consolidated interrupt message according to embodiments of the invention.

To facilitate efficiency improvements arising from the utilization of a plurality of queues where notifications are grouped and queued based on their target processors, an embodiment of the invention shown in FIG. 3 uses a process by which coalescing is done across and/or within queues. As an example, process 300 of FIG. 3 can essentially replace subprocess 230 in the prior art FIG. 2. Although FIG. 2 illustrates the processing of an I/O operation, this is not a limitation of the invention. The coalescing technique demonstrated in FIG. 3 can be applied to the processing of any suitable device operation that results in the generation of an interrupt.

The process of FIG. 3 may be performed by circuitry on a device, by a device driver, or by any other suitable component. The process may be performed as each notification is generated. In block 310, the device generates a notification detailing the preferred target processor to which the interrupt should be sent. The notification may be a packet of data, but may be represented in any suitable way. The preferred target processor may be chosen in any suitable way. In one embodiment, the target processor may be chosen based upon a hint or suggestion that a processor may have sent along with an operation request to the device. Alternatively, a processor in close proximity to the one designated in the hint may be picked. Generally, the target processor will be among the set of processors targeted by interrupt messages assigned to the device, such as messages $142_1 \ldots 142_3, 144_1, 144_2, 146_1 \ldots 146_3$ in FIG. 1, although this is not a limitation of the invention. The inventors have appreciated that predefining these messages such that the processors they target are distributed across proximity-based groups of processors may increase the likelihood that a device will be able to target an efficient processor. Also, this may increase the likelihood that the processor load is balanced. In this example, predefining a set of messages is one mechanism to define a set of processors that can be targeted. However, having predefined messages is not critical to the invention and any suitable mechanism for defining a set of target processors (including targeting any processor in a system) may be used.

In block 320, the notification is directed to the appropriate queue based on the processor it targets. The device will continue to generate and queue notifications in this fashion until one or more trigger events occur. Such trigger events may include but are not limited to a receipt of a threshold number of notifications in one queue or in a group of queues, expiration of a time period associated with one queue or a group of queues (i.e., a queue or combination of queues has "timed out"), the receipt of a threshold number of notifications in combination with the expiration of a time period associated with one queue or a group of queues, and any other such suitable event. The time period that causes a time out may relate to the length of time that a notification has stayed in a queue without being processed, though other time periods alternatively or additionally may be monitored to detect a time out. Such threshold numbers or time periods may be the same or may vary from queue to queue; these threshold values may remain fixed or may change dynamically for each queue and may be programmed through a device driver or in any suitable way.

At decision block 330, the device will begin monitoring all its queues for the occurrence of any such trigger events. The occurrence of a trigger event may result in the releasing or "flushing out" of the appropriate queue or queues. Subsequently, the released notifications are appropriately combined into a single interrupt message. If no trigger event has occurred, then the process begins again with block 310 and notifications continue to be generated and queued appropriately.

If, in the example of FIG. 3, a device queue or combination of queues exceed a threshold number of notifications (block 330), then those notifications are released and combined into one interrupt message (block 340). Or, if a threshold number of notifications is not exceeded, but a queue or combination of queues has timed out (block 344), then those notifications are instead released and combined into one interrupt message (block 346).

In some embodiments, a trigger event may occur in connection with one queue when that queue does not contain as many notifications as the device can consolidate into one notification. This scenario may occur if the trigger event is associated with a time out. However, in some embodiments, the threshold checked at decision block 330 may be less than the number of notifications that can be consolidated in a message. Accordingly, in some embodiments, queues in close proximity to those queues just released and/or queues or groups of queues that are sufficiently close to timing out are checked for any notifications that could also be combined into the consolidated interrupt message (block 350). If any such notifications for close processors exist and can be appropriately consolidated into the interrupt, then that may be done in block 360. This consolidated interrupt message consisting of all released and additionally selected notifications is then targeted to a particular processor (block 370) and sent to that processor to request some further action (block 380). The target processor ultimately chosen in block 370 can be chosen in any suitable way. In one example, if the majority of notifications in the consolidated message target one particular processor, then perhaps that "majority" processor will be targeted. Alternatively, in another example, if the majority processor is not a targeted processor among the set of interrupt messages designated to the device, a processor in close proximity to the majority processor may be chosen.

Figure 4A:
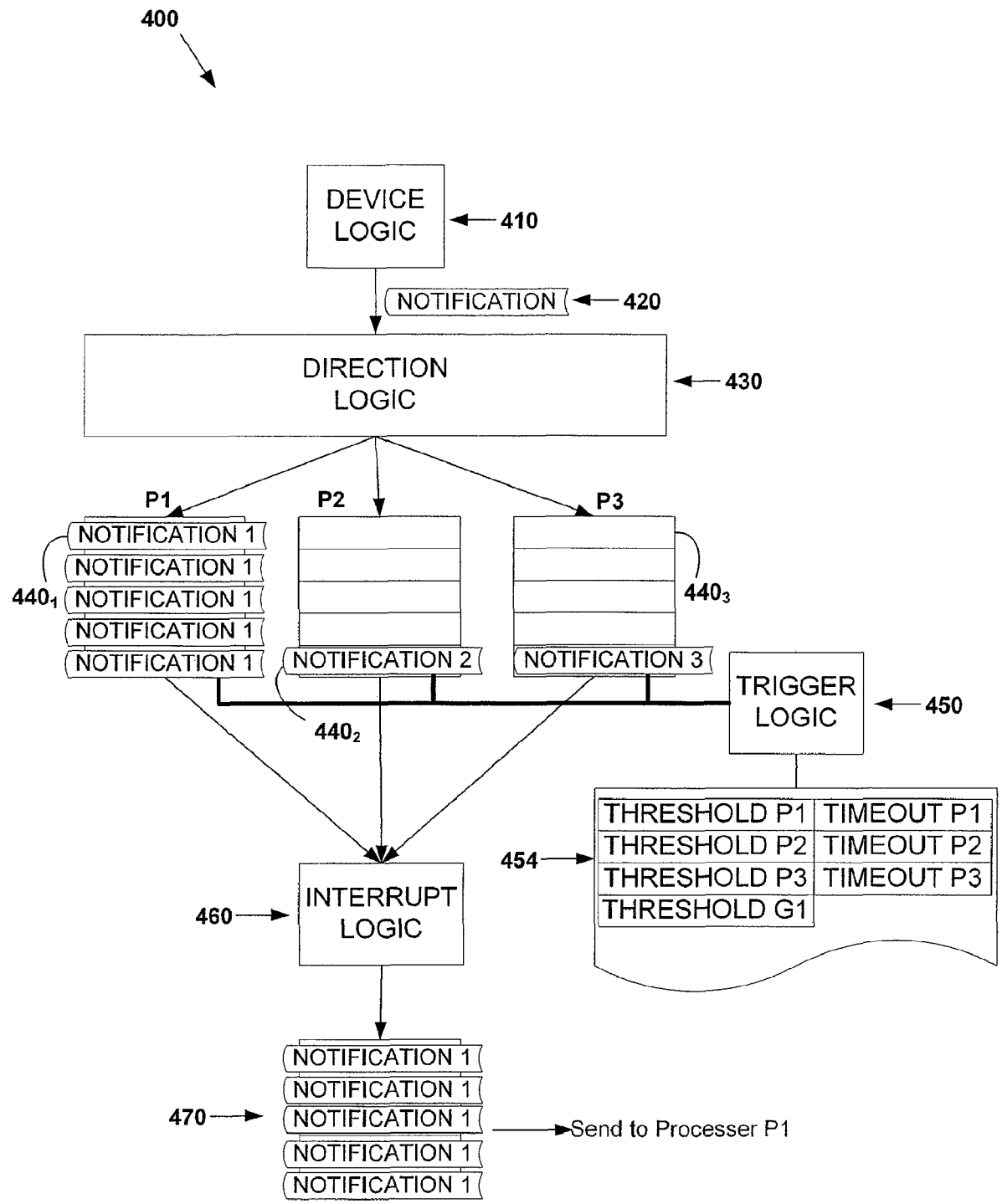
FIG. 4A is a block diagram illustrating how a full queue of interrupt notifications is released and consolidated into a single interrupt message according to embodiments of the invention.
Figure 4B:
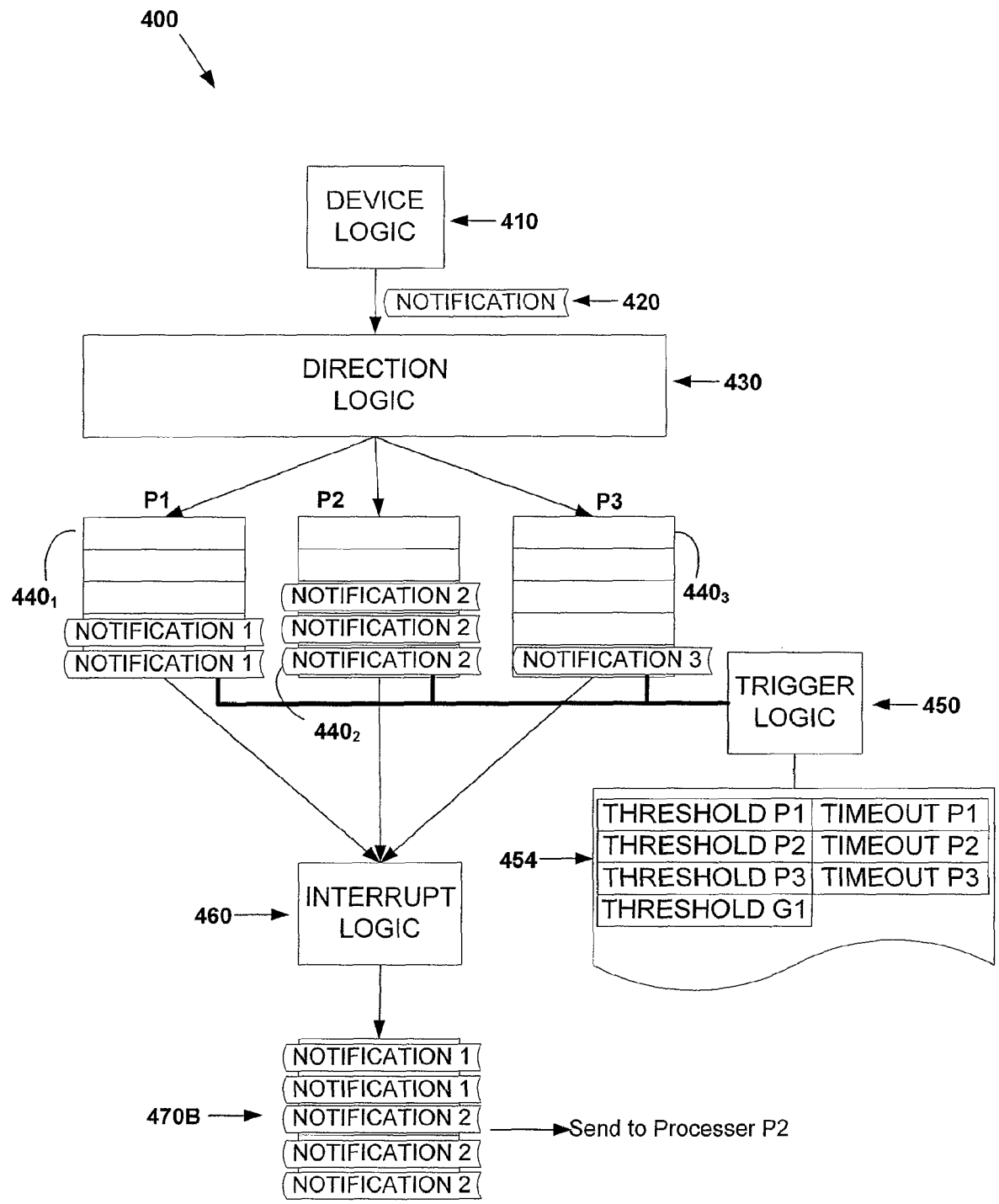
FIG. 4B is a block diagram illustrating how a group of queues, which collectively have exceeded a threshold number of notifications, is released and consolidated into a single interrupt message according to embodiments of the invention.
Figure 4C:
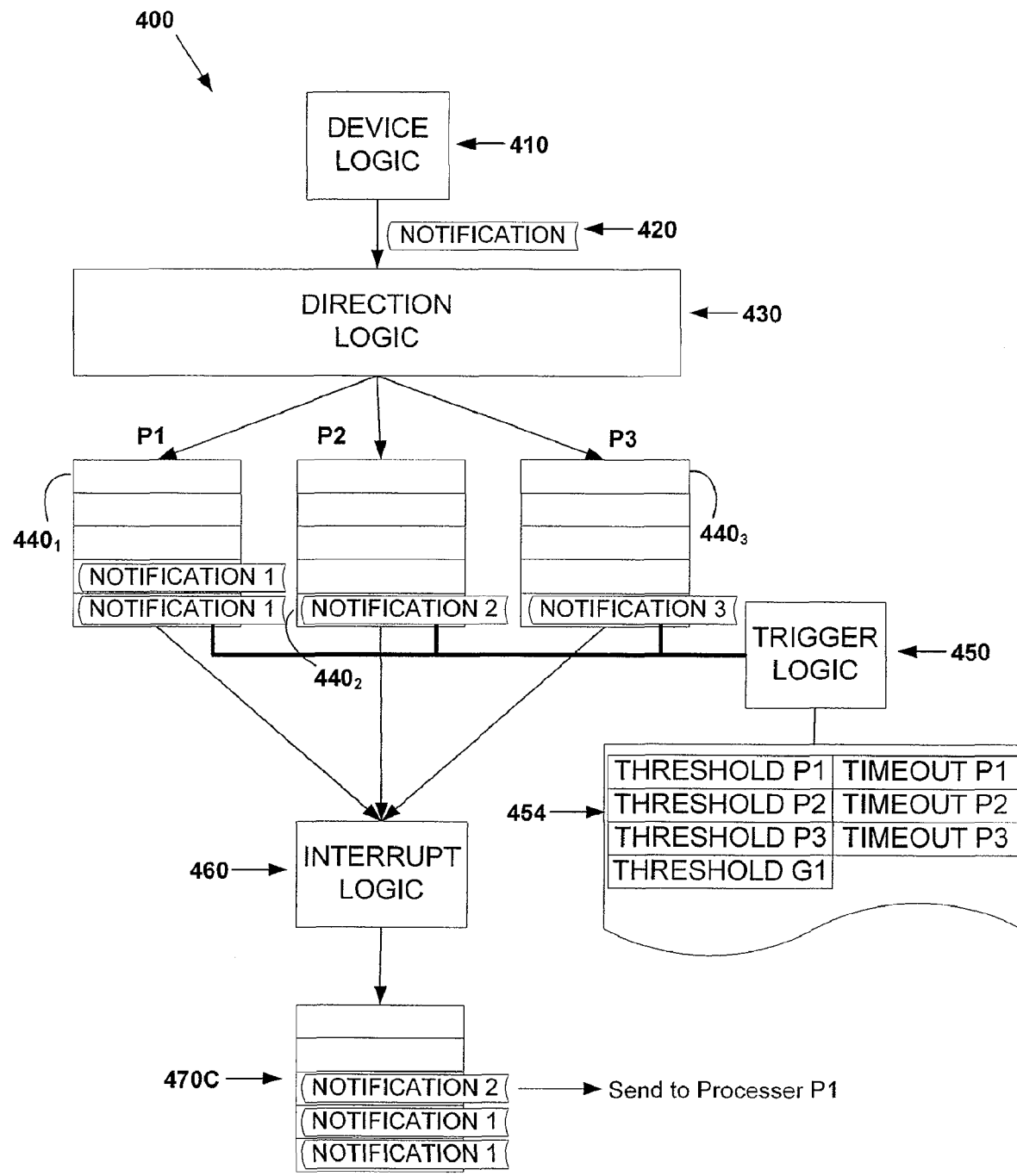
FIG. 4C is a block diagram illustrating how a partially full queue of interrupt notifications which has exceeded a time threshold is released and consolidated with notifications from a queue targeting a close processor to form a single interrupt message according to embodiments of the invention.

FIGS. 4A-4C illustrate various cases that may arise upon implementing various embodiments of the invention described in FIG. 3.

FIG. 4A, for example, is a block diagram depicting how a full queue of interrupt notifications is released and consolidated into a single interrupt message according to embodiments of the invention. In particular, device 400 includes device logic 410, which may be circuitry implemented in some suitable way, that performs an operation assigned to the device. This device logic is responsible for performing operations and appropriately generating notification packets (420). Directional logic (430) determines which queue each notification packet should be put in. This determination may be made based on what processor is initially targeted by the notification. The initially targeted processor may be selected based on the efficiency with which the targeted processor may respond to a notification. However, the target processor may be chosen in any suitable way as described in the discussion regarding FIG. 3.

Namely, in some embodiments, the target processor may be chosen based upon the hint or suggestion that a processor may have sent along with an operation request to the device. Alternatively, a processor in close proximity to the one designated in the hint may be picked. Generally, the target processor will be among the set of processors targeted by interrupt messages assigned to the device, although this is not a limitation of the invention. The inventors have appreciated that predefining these messages such that the processors they target are distributed as evenly as possible across proximity-based groups of processors may increase the likelihood that a device will be able to target an efficient processor. Also, this selection of a group of processors to target may increase the likelihood that the processor load is balanced.

Directional logic 430 may be a programmable circuit on device 400. The directional logic (430) may consequently determine how many queues may be designated for the device. It may also determine what processors each queue will be associated with. The total number of queues within the device may remain fixed or may change dynamically. Similarly, the target processors associated with each queue that are used to appropriately direct and queue notifications may remain fixed or may change dynamically from queue to queue and from time to time as device 400 is reconfigured. In this embodiment, three queues $440_1 \ldots 440_3$ are shown to queue notifications targeting processors P1, P2, and P3, respectively.

Trigger logic (450) may monitor the status of the queues $440_1 \ldots 440_3$ for one or more trigger events. In the embodiment illustrated, trigger logic 450 may detect events defined by data stored in a data structure 454. Some example trigger events are depicted in data structure 454 and are not considered to be a limitation of the invention. In this embodiment, the trigger events depicted in 454 include a receipt of a threshold number of notifications in queues $440_1 \ldots 440_3$, a threshold time period associated with each individual queue, and a threshold number of notifications in some group G1 of queues $440_1 \ldots 440_3$. Such threshold numbers or time periods may be the same or may vary from queue to queue; these values may remain fixed or may change dynamically for each queue. In the embodiment in FIG. 4A, for example, queues $440_1 \ldots 440_3$ are shown to each have the same threshold number of notifications, namely five. This is not, however, a limitation of the invention.

Finally, interrupt logic 460, in response to trigger logic 450 indicating that a trigger event occurred, releases notifications from their queues and consolidates the released notifications into a single interrupt message (470).

In addition to notifications in queues that are released, interrupt logic 400 may release notifications from other queues to consolidate into one message. Queues in close proximity to those queues just released and/or queues or groups of queues that are sufficiently close to timing out may be checked by the interrupt logic (460) for any notifications that could also be combined into the consolidated interrupt message. If any such notifications for close processors exist and can be appropriately consolidated into the interrupt without exceeding the threshold number of notifications associated with the interrupt message, then that may also done by the interrupt logic (460). In the example of FIG. 4A, the consolidated interrupt message 470 is shown to be capable of holding five notifications. However, the number of notifications in the consolidated interrupt message is not a limitation of the invention and any appropriate value may be used, including a value that may be more than the threshold value associated with one or more of the queues.

The consolidated interrupt message (470) consisting of all released and additionally selected notifications may then be targeted to a particular processor and sent to that processor requesting some further action. The processor ultimately targeted by the consolidated interrupt message can be chosen in any suitable way. In one example, if the majority of notifications in the consolidated message target one particular processor, then that "majority" processor may be targeted. Alternatively, in another example, if the majority processor is not a targeted processor among the set of interrupt messages designated for the device, a processor in close proximity to the majority processor may be chosen.

In the example of FIG. 4A, queue $440_1$ containing notifications targeting processor P1 is shown to have reached its threshold value of notifications. In other words, queue $440_1$ is full. This queue is released or flushed, and all five notifications are added to the consolidated interrupt message 470. Because the threshold of notifications has been met for the message 470, no other queued notifications are inspected. Also, because all five consolidated notifications indicate the same preferred target processor P1, the interrupt message is also sent to processor P1.

FIG. 4B illustrates device 400 in an alternative operating state. As illustrated in FIG. 4A, device logic 410 performs operations and issues notifications 420. Directional logic 430 routes each of the notifications to one of the queues $440_1 \ldots 440_3$. In the operating state indicated, two notifications are queued in queue $440_1$. Three notifications are queued in queue $440_2$. In this example, two or more of the queues may be regarded as forming a group and trigger events may be defined for that group. In the example of FIG. 4B, queues $440_1$ and $440_2$ may be regarded as forming a group G1.

Data structure 454 may store data defining trigger events for the group G1 in addition to information stored to define trigger events for the queues $440_1 \ldots 440_3$ individually. As a specific example, data structure 454 may store a threshold value of 5 for group G1. Such a threshold value may indicate that if the queues in the group G1, namely, queues $440_1$ and $440_2$, collectively store at least five notifications, the queues of the group may be flushed and some or all of the notifications in those queues may be consolidated into an interrupt message.

In the state illustrated in FIG. 4B, queue $440_1$ contains two notifications. Queue $440_2$ contains three notifications. Consequently, the group G1 collectively contains five notifications, which equals the threshold value stored for the group in data structure 454. In this operating state, trigger logic 450 may indicate that a trigger event associated with queues 440$_1$ and 440$_2$ has occurred. In response, interrupt logic 460 may retrieve the notifications from queues 440$_1$ and 440$_2$ and format them into a message 470B. In the example illustrated, message 470B is directed to processor P2 because the majority of notifications in message 470B initially targeted processor P2. However, the processor targeted by a message generated from notifications in a group of queues may be selected in any suitable way.

Likewise, the queues formed into a group may be selected in any suitable way. In the embodiment illustrated, queues 440$_1$ and 440$_2$ may be selected to form a group G1 because processors P1 and P2 are in close proximity, such as may occur when two processors are implemented as cores in the same semiconductor chip. Because there may be a relatively small loss of efficiency associated with interprocessor communications between processors that are in close physical proximity, forming groups as illustrated in FIG. 4B illustrates an alternative mechanism by which a device 400 operating according to an embodiment of the invention may be constructed or programmed to increase overall efficiency. Forming groups in this fashion may decrease the latency for the system to respond to any individual notification and can, on average, decrease the amount of overhead of processing consolidated interrupt messages by increasing the average number of notifications sent in each consolidated message. However, the specific manner in which groups are defined is not a limitation on the invention.

As another example, FIG. 4C is a block diagram illustrating how a partially full queue of interrupt notifications which has exceeded a time threshold may be released and consolidated with notifications from a queue targeting a close processor to form a single interrupt message according to some embodiments of the invention. As in FIGS. 4A and 4B, device 400 consists of device logic (410) that performs operations and appropriately generates notifications (420). Again, directional logic 430 assigns notifications to queues. In this example, there are three queues 440$_1$ ... 440$_3$, each accumulating notifications targeting processors P1, P2, and P3 respectively.

In this example, trigger logic 450 determines that queue 440$_1$ has timed out and the two accumulated notifications are released and consolidated into the single interrupt message 470C. Because the interrupt message has a threshold of five notifications which has not yet been met, interrupt logic 460 may look to other queues to identify whether other queued notifications may be efficiently consolidated into message 470C. Any suitable criteria may be used to identify notifications in other queues for efficient consolidation. For example, notifications from queues associated with processors that are in close proximity to the processor associated with a queue that has timed out may be consolidated. In this example, processor P2 associated with queue 440$_1$ may be in close proximity to processor P1, associated with queue 440$_1$. Accordingly, upon a time out of queue 440$_1$, interrupt logic 460 may check whether notifications in queue 440$_2$ may be added to message 470C without exceeding the limits on a number of notifications for a message. Accordingly, in the scenario depicted in FIG. 4C, message 470C includes notifications from queue 440$_1$ and 440$_2$. However, notifications from queue 440$_3$ have not been consolidated into message 470C because, in the example illustrated, processor P3 associated with queue 440$_3$ is not in close proximity to processor P1. A decision not to incorporate notifications from queue 440$_3$ into consolidated message 470C reflects the possibility that interprocessor communications associated with processor P1 processing a notification initially targeted for processor P3 may outweigh any benefits of increasing the number of notifications consolidated into message 470C.

FIG. 4C provides an example of a scenario in which notifications from queues that have not timed out may be combined with notifications from queues that have timed out to create a larger consolidated message. Another criteria that may be used to identify notifications that may be combined is whether, upon the timeout of one queue, another queue is about to time out. For example, FIG. 4C may alternatively represent a scenario in which queue 440$_2$ is about to time out when queue 440$_1$ times out. Even if processor P1 and P2 are not regarded to be in close proximity, it may be more efficient to consolidate notifications from queue 440$_2$ with notifications from queue 440$_1$. In this scenario, even though additional interprocessor communication is required by having processor P1 process notifications from queue 440$_2$ that initially targeted processor P2, the need to send a further interrupt message upon the time out of queue 440$_2$ may be avoided. In this way, the overhead of processing the interrupt message may be avoided, creating a net gain in efficiency.

In the examples of FIGS. 4A, 4B, and 4C, we depict that notifications from one or more queues are being combined into one consolidated message. Alternatively, these notifications could be combined into other intermediate queues or any number of layers of intermediate processing.

As should be appreciated from FIGS. 4A, 4B, and 4C, a device constructed according to embodiments of the invention may use any suitable criteria to detect a trigger event and may perform any suitable processing to form a consolidated message in response to the detection of such an event.

Having thus described several aspects of at least one embodiment of this invention, it is to be appreciated that various alterations, modifications, and improvements will readily occur to those skilled in the art.

Such alterations, modifications, and improvements are intended to be part of this disclosure, and are intended to be within the spirit and scope of the invention. Accordingly, the foregoing description and drawings are by way of example only.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers.

Further, it should be appreciated that a computer may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smart phone or any other suitable portable or fixed electronic device.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers may be interconnected by one or more networks in any suitable form, including as a local area network or a wide area network, such as an enterprise network or the Internet. Such networks may be based on any suitable technology and may operate according to any suitable protocol and may include wireless networks, wired networks or fiber optic networks.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, the invention may be embodied as a computer readable medium (or multiple computer readable media) (e.g., a computer memory, one or more floppy discs, compact discs, optical discs, magnetic tapes, flash memories, circuit configurations in Field Programmable Gate Arrays or other semiconductor devices, or other tangible computer storage medium) encoded with one or more programs that, when executed on one or more computers or other processors, perform methods that implement the various embodiments of the invention discussed above. The computer readable medium or media can be transportable, such that the program or programs stored thereon can be loaded onto one or more different computers or other processors to implement various aspects of the present invention as discussed above.

The terms "program" or "software" are used herein in a generic sense to refer to any type of computer code or set of computer-executable instructions that can be employed to program a computer or other processor to implement various aspects of the present invention as discussed above. Additionally, it should be appreciated that according to one aspect of this embodiment, one or more computer programs that when executed perform methods of the present invention need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that conveys relationship between the fields. However, any suitable mechanism may be used to establish a relationship between information in fields of a data structure, including through the use of pointers, tags or other mechanisms that establish relationship between data elements.

Various aspects of the present invention may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Also, the invention may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

What is claimed is:

1. A method of operating a device in a computing system comprising a plurality of processors, the device performing a plurality of operations that each generates notification to a processor of the plurality of processors, the method comprising:
    if a number exceeding a threshold of notifications targeting a first processor of the plurality of processors is generated before a trigger event, sending the generated notifications targeting the first processor to the first processor in a first consolidated message; and
    if a number exceeding the threshold of notifications targeting the first processor of the plurality of processors is not generated before the trigger event, sending the generated notifications targeting the first processor to the first processor in a second consolidated message, the second consolidated message further comprising notifications targeting at least one second processor of the plurality of processors.

2. The method of claim 1, wherein sending a first consolidated message and sending a second consolidated message each comprises sending a message over a bus using an MSI or MSI-X protocol.

3. The method of claim 1, wherein the trigger event comprises the passage of time.

4. The method of claim 1, wherein the method further comprises selecting the second processor based on proximity of the second processor to the first processor.

5. The method of claim 4, wherein:
    the first processor is a first core in a semiconductor chip; and
    selecting the second processor comprises selecting a second core in the chip.

6. The method of claim 4, wherein:
    the first processor is a first virtual processor executing on a physical processor; and
    selecting the second processor comprises selecting a second virtual processor executing on the physical processor.

7. The method of claim 4, wherein:
    the first processor is in a semiconductor chip mounted on a printed circuit board; and selecting the second processor comprises selecting a processor in a semiconductor chip on the printed circuit board.

8. The method of claim 1, further comprising generating the notifications, generating each notification comprising selecting a message from a plurality of messages, each message targeting a processor of the plurality of processors.

9. A method of operating a device in a computing system comprising a plurality of processors, the device performing a plurality of operations that each generates a notification to a processor of the plurality of processors, the method comprising:
   a) separately queuing notifications, the queuing comprising:
      i) queuing first notifications in a first queue, the first notifications targeted to a first processor among a set of target processors of the plurality of processors; and
      ii) separately queuing second notifications in a second queue, the second notifications targeted to a second processor among the set of target processors;
   b) monitoring to detect an event comprising:
      i) a number of queued notifications targeting at least one processor; or
      ii) the passage of time;
   c) in response to a detection of the event, forming a message to the first processor of the set, the message comprising a plurality of notifications, the notifications comprising at least one of the first notifications from the first queue and at least one of the second notification from the second queue.

10. The method of claim 9, further comprising, for each notification, prior to queuing the notification, selecting a target processor from among the set of target processors.

11. The method of claim 10, wherein selecting the target processor comprises selecting as the target processor a processor based on a suggestion provided with an instruction to perform an operation.

12. The method of claim 11, wherein selecting the target processor based on the suggestion comprises:
   selecting as the target processor a processor identified in the suggestion when the processor identified in the suggestion is among the set of target processors; and
   selecting a processor based on proximity to the processor identified in the suggestion when the processor identified in the suggestion is not among the set of target processors.

13. The method of claim 10, wherein forming a message to the first processor comprises forming a message to a processor of the set targeted by the most queued notifications when the event is detected.

14. The method of claim 9, wherein the act b) i) comprises a cumulative number of queued notifications targeting the first processor and the second processor, the second processor being selected based on proximity to the first processor.

15. The method of claim 9, wherein the first processor is a first core in a semiconductor chip and the second processor is a second core in the semiconductor chip.

16. A device for operating in a computing system comprising a plurality of processors, the device comprising:
   a bus interface;
   functional circuitry for performing at least one operation;
   notification circuitry, coupled to the functional circuitry, adapted to generate a notification to a processor of the plurality of processors in response to the functional circuitry performing an operation;
   computer storage media encoded with computer-executable instructions for sending messages through the bus interface, the computer-executable instructions that, when executed, control the device to perform a method comprising:
   if the notification circuitry generates a number exceeding a threshold of notifications targeting a first processor of the plurality of processors during an interval, sending the generated notifications targeting the first processor to the first processor in a first consolidated message; and
   if the notification circuitry does not generate a number exceeding a threshold of notifications targeting a first processor of the plurality of processors during the interval, sending the generated notifications targeting the first processor to the first processor in a second consolidated message, the second consolidated message further comprising notifications targeting at least one second processor of the plurality of processors.

17. The device of claim 16, wherein the bus interface comprises a PCI bus interface.

18. The device of claim 17, wherein the notification circuitry comprises a computer-storage medium adapted to store a plurality of MSI messages, each targeting a processor of the plurality of processors, the notification circuitry adapted to generate a notification by selecting a message of the plurality of MSI messages.

19. The device of claim 16, wherein the computer storage media is encoded with computer-executable instructions that, when executed, control the device to perform the method further comprising:
   receiving a specification of the threshold.

20. The device of claim 16, wherein: the device comprises a card and a controller; and
   the computer storage medium is disposed within the controller.

* * * * *